Jan. 7, 1930.                J. G. LARSSON                1,742,400
              SEPARATOR FOR CREAM OR SIMILAR LIQUIDS
                        Filed Nov. 10, 1927
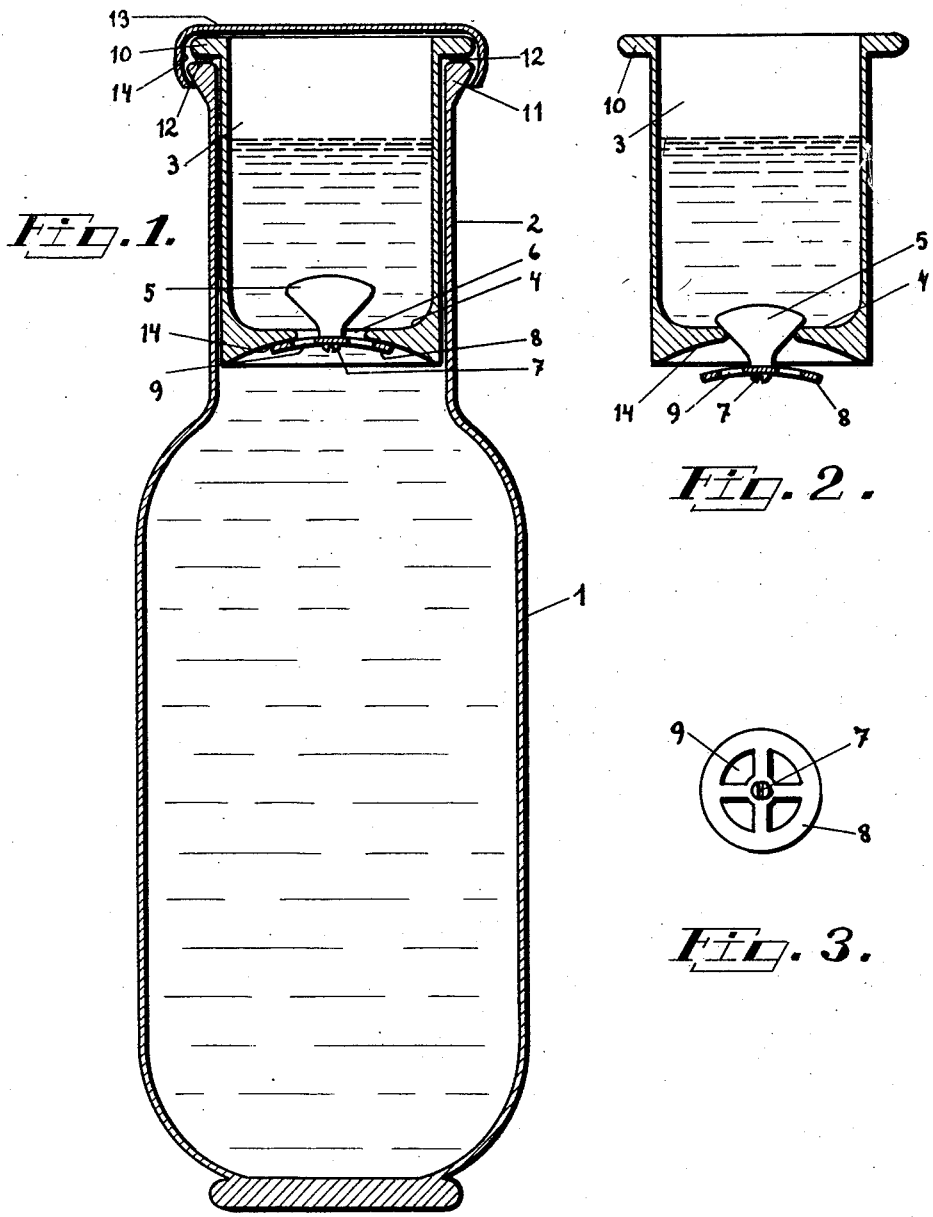
INVENTOR.
J. G. Larsson
BY Marks & Clerk
ATTORNEYS.

Patented Jan. 7, 1930

1,742,400

UNITED STATES PATENT OFFICE

JOHAN GEORG LARSSON, OF SVENSTORP, HALMSTAD, SWEDEN

SEPARATOR FOR CREAM OR SIMILAR LIQUIDS

Application filed November 10, 1927, Serial No. 232,444, and in Sweden June 19, 1926.

This invention relates to such devices which have as object to separate two liquids of different gravity such as cream and milk.

The principal object of this invention is to bring forth a device for the same purpose which is extraordinary cheap to procure and simple to operate.

Another object is to facilitate the removing of the two separated liquids from each other, and especially the withdrawing of the collected lighter liquid from the heavier one.

A further object is to save time for the separating process, so that this process can be completed automatically during an idle period such as for instance when the liquids are under transportation or left in a store.

When it concerns for instance such liquids as cream and milk, it is customary to separate the cream either by specially designed machines which usually operate under the influence of the centrifugal force and are generally known as separators or the cream is taken off by hand which generally is called "to skim the cream". The first mentioned method is very expensive, as the mechanical separators are rather dear to procure and costly to operate, so that this method can be applied only in dairies or in farms where a considerable amount of milk is to be treated. The hand skimming procedure on the contrary is somwhat intricate and requires skill if an approvable result shall be obtained. Further both the said methods can be carried out only by the spending of a special time and not automatically.

According to this invention the liquids to be separated are merely poured into a specially designed bowl or similar container in their existing condition and then left to themselves. The difference in gravity then will bring forth a separating process in such a way that the heavier constituent descends, and the lighter constituent collects on the top thereof. In the contracted upper portion of the bowl a small cup is suspended in such a way that the cup submerges into the liquid in the bowl, and thereby shuts off entirely the communication between the lower and upper portions of the bowl leaving only open an aperture in the bottom of the cup. This aperture, however, is provided with a closure in the shape of a float, so that when the cup is put down into the bowl and submerges into the liquid therein, the float ascends and allows the upper portion of the liquid to enter the cup through the aperture opened by the ascending float closure. When the setting procedure is completed the heavier constituent has sunk down in the bowl and the lighter constituent ascended on the top thereof and collected in the cup. It depends thereby on the proportions of the cup in relation to the quantities of lighter and heavier constituents as well as to the total quantity of the content in the bowl, and especially how deep the cup submerges into the liquid, if all the lighter constituent becomes collected in the cup or if some portion thereof still remains below the bottom of the cup, or if some portion of the heavier constituent also has entered the cup. Thus it is essential to design the device so that the cup obtains the proper dimensions for the purpose.

When now the cup is lifted, the float descends on account of the dynamic pressure and closes the aperture in the bottom of the cup thus preventing the liquid in the cup to escape therethrough, and the cup can be removed with the separated liquid collected therein. The float must be of such a buoyancy that it opens the entrance to the cup when the cup becomes put down into the bowl, and closes the same opening as soon as the cup becomes lifted for the removing of the collection therein.

In the accompanying drawing Fig. 1 illustrates in elevated section an embodiment of the invention during the separating process. Fig. 2 is an adequate section of the cup when removed from the bowl to carry away the collected lighter constituent, and Fig. 3 is a look from below of the closure for the cup bottom.

In the drawing 1 designates the body portion of the bowl, which preferably has the character of a glass or metallic bottle such as frequently used for the distributing of milk to the households. However, I do not want to limit my invention to exclusively such kinds of containers. In the embodiment illustrated the upper portion of the container 1 is contracted to a neck 2 of a cylindrical shape. In this neck the cup 3 is inserted whereby said cup fills up the neck entirely, so that there is left practically no interspace between the side walls of neck 2 and cup 3. The bottom 4 of the cup is pierced through by an opening 6 which can be closed by means of a selfacting valve. This valve comprises a float 5 of some suitable material and size, so that the float will open the aperture 6 when the cup gets inserted into the bowl, and the bowl is filled up with a liquid of such a height that the bottom 4 of the cup descends below the liquid level. As shown in the drawing the valve and float can establish one and the same member, but also the valve can be made of one piece and the float of another, and the two pieces connected in due manner. In order to prevent a nonintentional removing of the valve 5 the same is provided on the down side with a stopper 8 for instance designed as a plate with roomy openings 9 for the free passage of the liquid into the cup when the valve 5 is raised as shown in Fig. 1. The stopper can, of course, be designed otherwise as for instance in the shape of a cross whereby the only request is, that the stopper shall prevent the nonintentional removal of the valve 5, but not obviate the free passage of the liquid to the valve opening 6. When it is wanted to remove the valve 5 the stopper 8 can be withdrawn by loosing a fastening screw 7.

The cup 3 at its upper border is provided with a collar 10 which supports the cup on the usual bulb 11 around the mouth of the neck 2. To protect the neck 2 as well as the cup 3 when inserting the latter a soft packing ring 12 can be disposed between bulb 11 and collar 10. A cover 13 can be applied above the cup 3 making a closure for the apparatus whereby said cover can be provided with yielding rims 14 cooperating with the collar 10 and bulb 11 so as to keep the cover on place, but allowing an easy removing thereof. Of course, any other adequate closure can be used.

It is not necessary that the neck 2 and cup 3 are cylindrical as they can also be flared upwards or shaped otherwise, but it is essential that the two members fit each other tightly at least within the boundary of the bottom 4, so that any noteworthy quantity of liquid can not enter the interspace between the two parts.

It is not essential, that the valve 5 shall be carried by a float, but other means can be substituted provided that they suit the request to automatically open the aperture 6 for pressures from below, so that the lighter constituent can enter the cup, and to automatically close said aperture for pressure from above to allow the cup to be removed with the collection secured therein.

The cup 3 can be made of glass or some suitable metal such as aluminum, and the float valve 5 also can be made of any material suitable for its purpose. The shape or outer appearance of the various parts is also without influence on the invention proper, provided that the mode of operation here described can be brought forth.

What I claim is:—

In combination with a liquid container having a substantially cylindrical neck portion and a covering therefor, means for separating liquids having different specific gravities, said means comprising a cup having dimensions conforming substantially with the interior dimensions of said neck portion and being adapted to be secured in said container by the container covering, said cup having an aperture in the bottom thereof, a bouyant valve member adapted to automatically keep said aperture open as long as said cup remains stationary in the liquid, and to close said aperture automatically by its inertia when the cup is moved upwards to be removed from the liquid, and means for limiting the movement of said valve with respect to said aperture.

In testimony whereof I have affixed my signature.

JOHAN GEORG LARSSON.